(12) United States Patent
Jin et al.

(10) Patent No.: US 9,680,165 B2
(45) Date of Patent: Jun. 13, 2017

(54) SEPARATOR AND FUEL CELL WITH THE SAME

(71) Applicants: Hyundai Motor Company, Seoul (KR); Kia Motors Corporation, Seoul (KR)

(72) Inventors: Sang Mun Jin, Yongin-si (KR); Yoo Chang Yang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 14/686,976

(22) Filed: Apr. 15, 2015

(65) Prior Publication Data

US 2015/0303492 A1 Oct. 22, 2015

(30) Foreign Application Priority Data

Apr. 22, 2014 (KR) ........................ 10-2014-0048240

(51) Int. Cl.
| | |
|---|---|
| *H01M 8/04* | (2016.01) |
| *H01M 8/0258* | (2016.01) |
| *H01M 8/0232* | (2016.01) |
| *H01M 8/0254* | (2016.01) |
| *H01M 8/0267* | (2016.01) |
| *H01M 8/1018* | (2016.01) |

(52) U.S. Cl.
CPC ....... *H01M 8/0258* (2013.01); *H01M 8/0232* (2013.01); *H01M 8/0254* (2013.01); *H01M 8/0267* (2013.01); *H01M 2008/1095* (2013.01); *H01M 2250/20* (2013.01); *Y02T 90/32* (2013.01)

(58) Field of Classification Search
CPC ............. H01M 8/0258; H01M 8/0232; H01M 8/0254; H01M 8/0267; H01M 2008/1095; H01M 2250/20; Y02T 90/32
See application file for complete search history.

(56) References Cited

U.S. PATENT DOCUMENTS

| | | |
|---|---|---|
| 7,112,385 B2 | 9/2006 | Rock |
| 2003/0186106 A1 | 10/2003 | Frank et al. |

FOREIGN PATENT DOCUMENTS

| | | | |
|---|---|---|---|
| JP | 2006-147309 A | 6/2006 | |
| JP | 2010-015725 | * 1/2010 | .............. H01M 8/02 |
| JP | 2010-015725 A | 1/2010 | |
| JP | 2011-076973 A | 4/2011 | |
| JP | 2011-170989 A | 9/2011 | |
| JP | 2014-022270 A | 2/2014 | |
| KR | 10-2009-0009342 A | 1/2009 | |

* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

A separator for a fuel cell is provided. The separator is disposed at both sides of a membrane-electrode assembly and is configured to supply a reaction gas to the membrane-electrode assembly. In addition, the separator includes a conductive microporous body that is formed on a reaction surface corresponding to the membrane-electrode assembly and a channel unit that is connected to an inlet manifold and an outlet manifold through which the reaction gas flows and is configured to guide the reaction gas to the reaction surface.

7 Claims, 5 Drawing Sheets

SEPARATOR AND FUEL CELL WITH THE SAME

CROSS-REFERENCE TO RELATED APPLICATION

This application claims priority to and the benefit of Korean Patent Application No. 10-2014-0048240 filed in the Korean Intellectual Property Office on Apr. 22, 2014, the entire contents of which are incorporated herein by reference.

BACKGROUND (a) Field of the Invention

An exemplary embodiment of the present invention relates to a fuel cell stack of a fuel cell system. More particularly, the present invention relates to a separator having a microporous structure and a fuel cell including the separator.

(b) Description of the Related Art

As known in the art, a fuel cell is composed of unit cells that generate electric energy from an electrochemical reaction of hydrogen and oxygen. Such a fuel cell may be structured by arranging separators at both sides with a membrane-electrode assembly (MEA) therebetween. Reaction channels for supplying fuel and a reaction gas (e.g., air) to the membrane-electrode assembly and a cooling channel for passing cooling water are formed in the separators. A gas diffusion layer for diffusing the reaction gas is formed on both sides of the membrane-electrode assembly.

To maximize the performance of the fuel cell, the surface pressure of the gas diffusion layers and the membrane-electrode assembly require uniformity achieved by narrowing the gap between the reaction channels of the separators and uniform permeability is achieved throughout the reaction surfaces of the gas diffusion layers. However, there is a limit in reducing the gap between the reaction channels of the separators to prevent various defects caused in the process of forming of the separators and the following factors decreasing the performance of the fuel cell are generated due to this practical problem.

First, when the gap between the reaction channels is substantial, stress concentrates on the contact surface between the separator and the gas diffusion layer. Accordingly, the porous structure of the gas diffusion layer may break thus causing the permeability for the reaction gas to deteriorate, and the ability of diffusing the reaction gas and the ability of discharging product water may decrease. Further, since stress is minimal in the surface where the reaction channels are formed, the gas diffusion layer protrudes from the channel portions of the separator, such that fluidity of fluid may be deteriorated.

Second, as the structure of the gas diffusion layer is broken due to the concentration on the contact surface of the separator, carbon fibers may permeate to an electrode layer of the membrane-electrode assembly through the broken areas, such that the electrode layer may be damaged.

Third, in the channel portions with the gas diffusion layer exposed, the reaction gas is supplied sufficiently and an active chemical reaction may occur, but contact resistance may increase due to lack of surface pressure between the gas diffusion layer and the membrane-electrode assembly, causing potential difficulty in the movement of electrons produced by the reaction.

To improve the above problems, a formed-porous member having a three dimensional (3D) porous structure by forming channels and a porous structure having micro-holes in a substantially thin metal plate has been used in the related art. Further, a method of inserting a microporous structure to uniformly distribute surface pressure and improve the abilities of diffusing a reaction gas and discharging product water, instead of a separator with reaction channels, has been used. Since a microporous structure such as metal foam and a wire mesh has a substantially high aperture ratio and distributes surface pressure, the gas diffusion layer may be compressed uniformly.

In those materials, the metal foam has a substantial number of bubbles connected with each other within the metallic material, and thus may pass fluid and have a substantially high ratio of surface area per volume and strength, and accordingly, it is suitable for the material of separators in fuel cells. However, in the related art, the most important defect of the metal foam is that it may be impossible to control the flow of a reaction gas and product water due to random connection of the internal bubbles and thus it may be difficult to efficiently use the entire reaction surface.

Further, since a microporous structure is used for separators in the related art, the pressure difference in the separators is substantially increased and thus parasitic power of a fuel cell system increases, a fuel cell increases in volume, and micropores may be clogged, with the fuel cell oversaturated with water (condensate water), such that operation safety of the fuel cell decreases.

The above information disclosed in this section is merely for enhancement of understanding of the background of the invention and therefore it may contain information that does not form the prior art that is already known in this country to a person of ordinary skill in the art.

SUMMARY

The present invention provides a separator having an advantage of more uniformly distributing flow of a reaction gas with a microporous structure and allowing more stable operation of a fuel cell even under interference from the exterior such as sudden inflow of water due to over-condensing of the water, and a fuel cell including the separator.

An exemplary embodiment of the present invention provides a separator for a fuel cell disposed at both sides of a membrane-electrode assembly and configured to supply a reaction gas to the membrane-electrode assembly. The separator may include: a conductive microporous body formed on a reaction surface that corresponds to the membrane-electrode assembly; and a channel unit connected to an inlet manifold and an outlet manifold for the reaction gas to flow inside and outside and guides the reaction gas to the reaction surface.

Further, the channel unit may form channels that expand from the inlet manifold and the outlet manifold to the reaction surface. In addition, the channel unit may form channels connected from the inlet manifold and the outlet manifold to the reaction surface. The channels may increase in length, from one of the inlet manifold and the outlet manifold to the other one, and may be connected to the reaction surface. Furthermore, ribs may protrude between the channels and separation walls may be formed on the reaction surface and may divide the microporous body into several sections. The separation walls may be formed in the shapes of grooves on the side opposite to the reaction surface and may protrude toward the reaction surface. The grooves may be formed as cooling passages through which a coolant may flow.

In addition, the channel unit may form channels connected from the inlet manifold and the outlet manifold to the reaction surface and may form ribs between the channels. The separation walls that divide the microporous body into several parts may be formed on the reaction surface. Additionally, the separation walls may be connected with the ribs and may divide the reaction surface into several reaction areas. The separation walls may also divide the channels into several channel groups connected with the reaction areas, respectively.

Another exemplary embodiment of the present invention provides a fuel cell that may include: a membrane-electrode assembly; separators disposed at both sides of the membrane-electrode assembly; and a conductive microporous body formed on a reaction surface of the separator that corresponds to the membrane-electrode assembly and is configured to supply a reaction gas to the membrane-electrode assembly, in which the separator may have inlet and outlet manifolds for the reaction gas to flow inside and outside (e.g., into and out of) and a channel unit connected with the inlet manifold and the outlet manifold and configured to guide a reaction gas to the reaction surface.

In addition, the channel unit may form channels that expand from the inlet manifold and the outlet manifold to the reaction surface. The channels may increase in length from one of the inlet manifold and the outlet manifold to the other one, and may be connected to the reaction surface. The channel unit may form ribs between the channels.

Additionally, separation walls that divide the microporous body into several sections may be formed on the reaction surface of the separator. The separation walls may be formed in the shapes of grooves on the side opposite to the reaction surface and may protrude toward the reaction surface. The grooves may be formed as cooling passages through which a coolant may flow.

Further, the separation walls that divide the microporous body into several parts may be formed on the reaction surface of the separator. The separation walls may be connected with the ribs and may divide the reaction surface into several reaction areas. The separation walls may also divide the channels into several channel groups connected with the reaction areas, respectively.

According to an exemplary embodiment of the present invention, it may be possible to more uniformly distribute a reaction gas to the microporous body of the reaction surface through the channel unit of the separator and to improve performance of a fuel cell. Further, according to exemplary embodiment of the present invention, the reaction surface of the separator may be divided into several reaction areas by the separation walls, the microporous body may be divided into several parts in the reaction areas, and the channels of the channel unit may be divided into several channel groups connected with the reaction areas, respectively.

Accordingly, in an exemplary embodiment of the present invention, it may be possible to continuously uniformly distribute reaction gases to the microporous body, maintain more stable performance of the fuel cell even under temporary interference from the exterior such as over-inflow of condensate water, and prevent flow stagnation of the reaction gases due to partial concentration of product water produced by a reaction. Further, in an exemplary embodiment of the present invention, since the grooves forming the separation walls may be used as the cooling passages through which a coolant may flow, the efficiency of cooling a fuel cell may be increased.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

Figure 1:
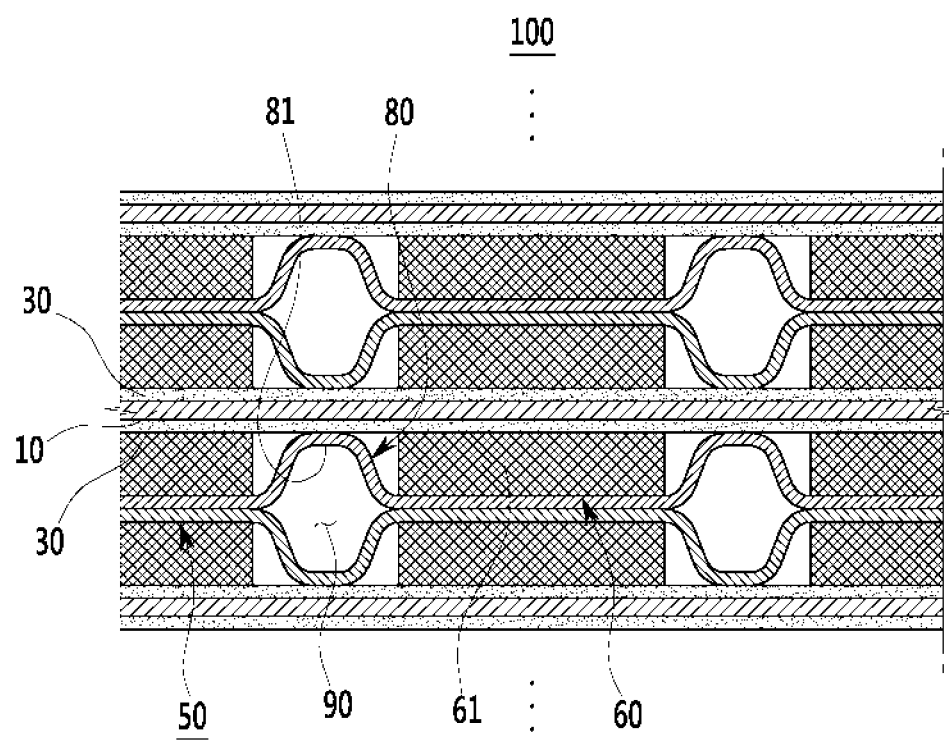
FIG. 1 is an exemplary cross-sectional view showing a portion of a fuel cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The parts not related to the description of the exemplary embodiments are not shown to make the description clear and like reference numerals designate like elements throughout the specification. Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, and the second, etc. in the following description is for discriminating them for the same relationship of the components and the components are not limited to the order in the following description. Further, the terms, " . . . unit", " . . . mechanism", " . . . portion", " . . . member" etc. used herein mean the units of inclusive components performing at least one or more functions or operations.

FIG. 1 is an exemplary cross-sectional view showing a portion of a fuel cell according to an exemplary embodiment of the present invention. Referring to FIG. 1, a fuel cell 100 according to an exemplary embodiment of the present invention may include unit cells each of which may be configured to receive a hydrogen gas (e.g., fuel) and an oxidizing gas (e.g., air) (hereafter, referred to as reaction gases), and may be configured to generate electric energy using an electrochemical reaction of hydrogen and oxygen.

A plurality of sheets of fuel cells 100 may be sequentially stacked in a fuel cell stack and may be configured to generate, as reaction byproducts, heat and discharge product water that is condensate water. For example, the fuel cell 100 may include a membrane-electrode assembly (MEA) 10, gas diffusion layers 30 on both sides of the membrane-electrode assembly 10, and separators 50 in close contact with (e.g., adjacent to) the gas diffusion layers 30. The membrane-electrode assembly 10 may be structured by forming an anode layer on one side of an electrolyte membrane and a cathode layer on the other side of the electrolyte membrane.

The anode layer may decompose a reaction gas (e.g., a hydrogen gas) into electrons and protons by oxidizing the gas and the electrolyte membrane may move the protons to the cathode layer. The cathode layer may produce water and heat by deoxidizing the electrons and protons from the anode layer and a reaction gas (e.g., air) supplied separately. The gas diffusion layers 30 for diffusing the reaction gas supplied through the separators 50 to the anode layer and the cathode layer of the membrane-electrode assembly may have electric conductivity and may be formed on the anode layer and the cathode layer. The separators 50 for supplying a reaction gas to the membrane-electrode assembly 10 through the diffusion layers 30 may be formed of an electrically conductive material.

An inlet manifold 51 and an outlet manifold 52 for a reaction gas to flow inside and outside may be formed at the edges of both sides of the separator 50. The separator 50 may have a reaction surface 53 that corresponds to the gas diffusion layer 30 and may be connected with the inlet manifold 51 and the outlet manifold 52. While the fuel cell 100 including the gas diffusion layers according to an exemplary embodiment of the present invention has been described, the present invention is not limited to the aforementioned description, and the present invention may be applied to the fuel cell except the gas diffusion layers. In the following description, the fuel cell 100 including the gas diffusion layer 30 will be described as an example.

The separator 50 for a fuel cell according to an exemplary embodiment of the present invention has a structure capable of more uniformly distributing surface pressure on the membrane-electrode assembly 10 and improving the abilities of diffusing a reaction gas and of discharging product water. Further, an exemplary embodiment of the present invention provides a separator 50 for a fuel cell allows a more stable operation of a fuel cell even under interference from the exterior such as sudden inflow of water due to over-condensing of the water.

Figure 2:
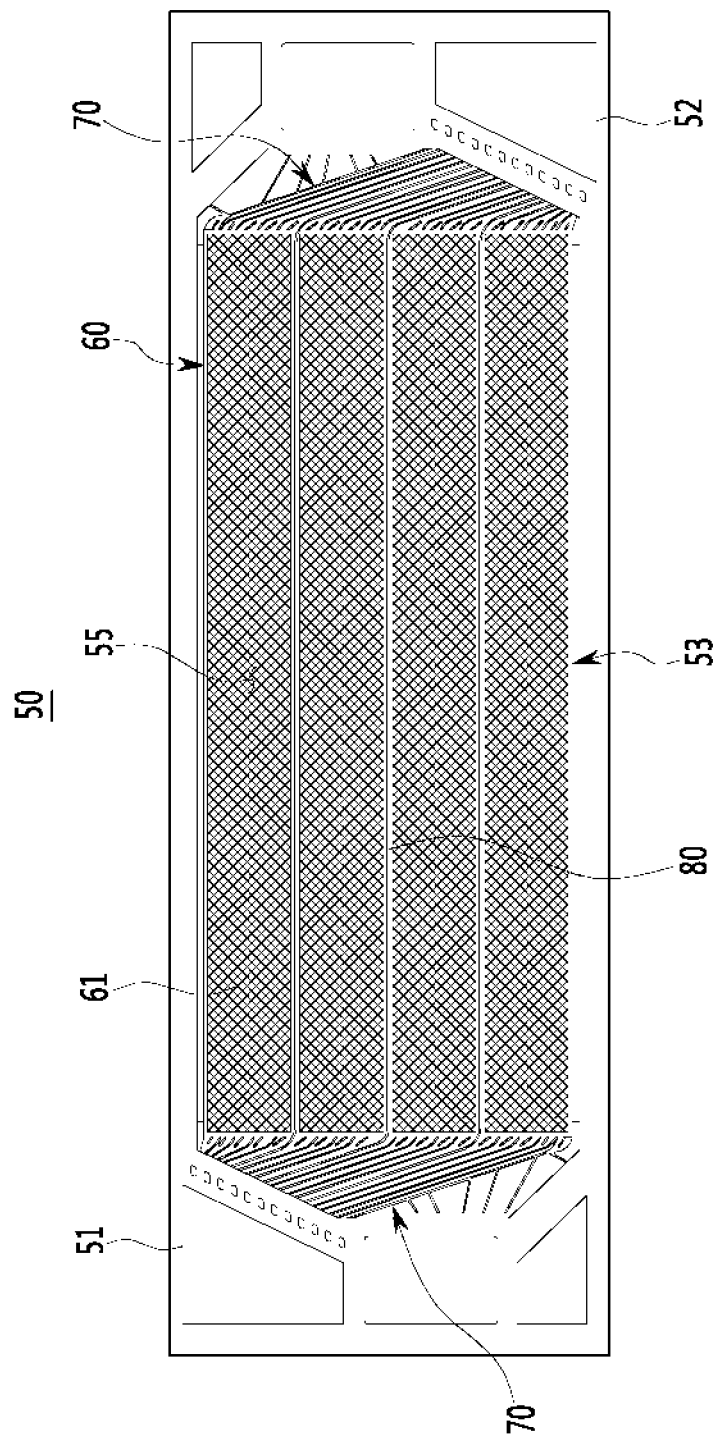
FIG. 2 is an exemplary view showing a separator for a fuel cell according to an exemplary embodiment of the present invention.
Figure 3:
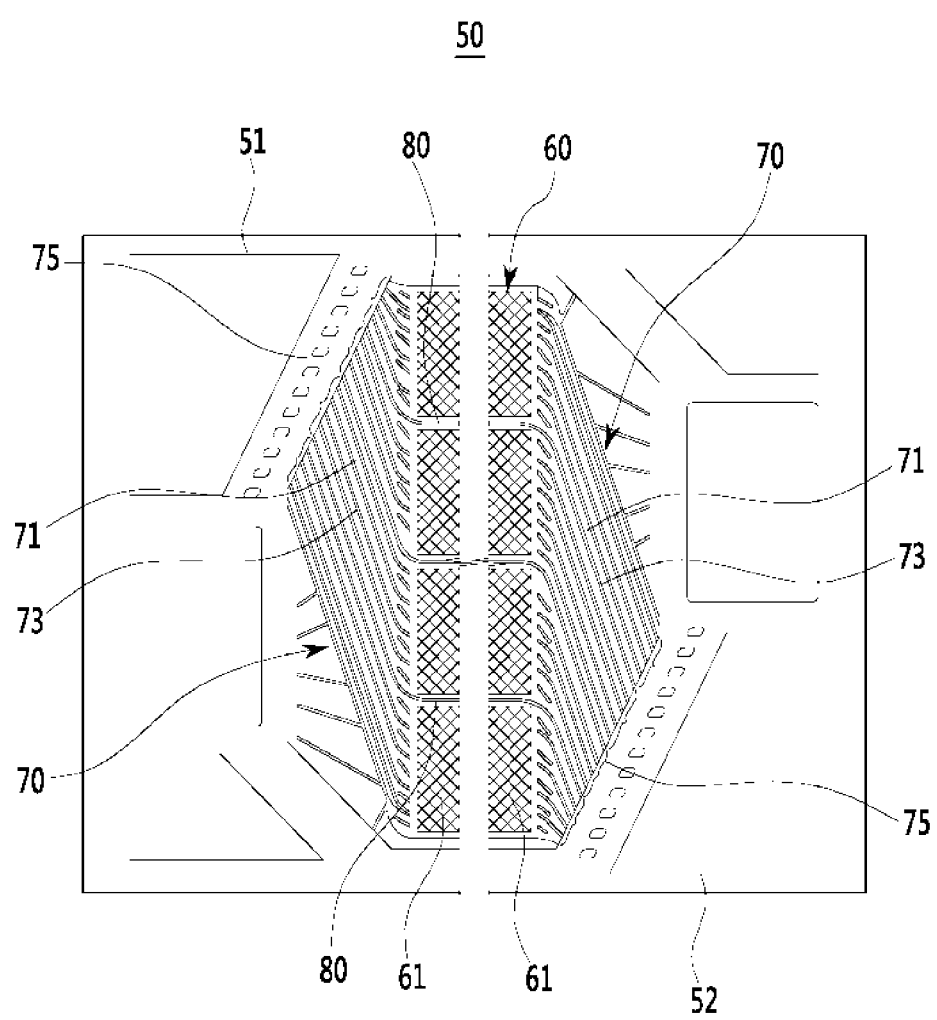
FIG. 3 is an exemplary detailed view showing a portion of the separator for a fuel cell according to an exemplary embodiment of the present invention.

FIG. 2 is an exemplary detailed view showing a separator for a fuel cell according to an exemplary embodiment of the present invention and FIG. 3 is an exemplary detailed view showing a portion of the separator for a fuel cell according to an exemplary embodiment of the present invention. Referring to FIGS. 1 to 3, the separator 50 for a fuel cell according to an exemplary embodiment of the present invention may include a microporous body 60 and a channel unit 70.

In an exemplary embodiment of the present invention, the microporous body 60 may be configured to supply a reaction gas to the membrane-electrode assembly 10 through the gas diffusion layer 30 and may be formed on the reaction surface 53 described above. The microporous body 60 may be metal foam having a predetermined aperture ratio (called "porosity" in this field). For example, the microporous body 60 may be made of any one material selected from silver, copper, gold, aluminum, tungsten, zinc metal, and metal alloys which have high electric conductivity. Since the metal material of the microporous body 60 may contain a plurality of bubbles connected to each other, a reaction gas and product water may pass through the microporous body 60, the ratio of the surface area to unit volume may increase, and the strength may increase.

In an exemplary embodiment of the present invention, the channel unit 70 may be configured to more uniformly distribute flow of a reaction gas to the microporous body 60 of the reaction surface 53 and prevent partial concentration of product water produced by a reaction and flow stagnation of the reaction gas due to the concentration. The channel unit 70 may be configured to guide the reaction gas flowing into the inlet manifold 51 to the microporous body 60 of the reaction surface 53 and allow the reaction gas that has passed through the microporous body 60 to flow to the outlet manifold 52. The channel unit 70 may be connected to the inlet manifold 51 and the outlet manifold 52 and may include channels 71 connected to the reaction surface 53.

The channels 71 may have a shape that expands toward the reaction surface 53 from the inlet manifold 51 and the outlet manifold 52 and may be formed between the inlet manifold 51 and the reaction surface 53 and between the outlet manifold 52 and the reaction surface 53, respectively. For example, the channels 71 may have a shape increasing in length from first sides to second sides of the inlet manifold 51 and the outlet manifold 52, and may be connected with the reaction surface 53. Further, ribs 73 may be formed to protrude between the channels 71 and may have a shape increasing in length from the first sides to the second sides of the inlet manifold 51 and the outlet manifold 52. The separator 50 for a fuel cell according to an exemplary embodiment of the present invention may further include separation walls 80 formed on the reaction surfaces 53 and that divide the microporous body 60 into several sections.

In an exemplary embodiment of the present invention, the separation walls 80 may be formed in the shapes of grooves 81 at the side opposite to the reaction surface 53, protrude toward the reaction surfaces 53, and extend from the inlet manifold 51 to the outlet manifold 52. In other words, the separation walls 80 may protrude on the reaction surface 53, divide the reaction surface 53 into several reaction areas 55, and may divide the microporous body 60 into a plurality of parts 61 in the reaction areas 55.

The reaction areas 55 may be connected with the channels 71 at the inlet manifold 51 and the outlet manifold 52 and the separation walls 80 may be connected with the ribs 73 of the channel unit 70. In other words, the separation walls 80 may be connected with the ribs 73 of the channel unit 70 at the inlet manifold 51 and with the ribs 73 of the channel unit 70 at the outlet manifold 52. Accordingly, the separation walls 80 may divide the channels 71 of the channel unit 70 into several channel groups 75 connected with the reaction areas 55, respectively.

The separation walls 80 may be, as described above, formed in the shapes of grooves 81 on the side opposite to the reaction surface 53, and the grooves 81 may form cooling passages 90 through which a coolant may flow when the fuel cells 100 are stacked. In other words, when a fuel cell stack is formed by stacking a plurality of sheets of fuel cells 100, the sides opposite to the reaction surfaces 53 of the separators 50 may be in close contact with (e.g., may be adjacent to) each other and the grooves 81 on the opposite sides may be combined to form the cooling passages 90. The operation of the fuel cell 100 according to an exemplary embodiment of the present invention which has the configuration described above is described hereafter in detail with reference to the drawings.

First, in an exemplary embodiment of the present invention, a first reaction gas (e.g., a hydrogen gas) may be supplied to the inlet manifold 51 of a first separator 50 and a second reaction gas (e.g., air) may be supplied to the inlet manifold 51 of a second separator 50. The reaction gases may be diffused through the channels 71 of the channel unit 70 and guided to the reaction surfaces 53 of the separators 50, and then uniformly flow into the microporous bodies 60 of the reaction surfaces 53. The reaction gases may be diffused through the channel groups 75 of the channels 71 and guided to the reaction areas 55 of the reaction surfaces 53 divided by the separation walls 80, to allow the reaction gases to flow more uniformly into the parts 61 of the microporous bodies 60 divided in the reaction areas 55.

The reaction gases (e.g., hydrogen gas and air) may be diffused through the gas diffusion layer 30 and supplied to the anode layer and the cathode layer of the membrane-electrode assembly 10, respectively, and electric energy may be generated by an electrochemical reaction of hydrogen and oxygen on the anode layer and the cathode layer, such that heat and product water that is condensate water may be produced. The reaction gases passing through the parts 61 of the microporous body 60 may be discharged to the outlet manifold 52 through the channels 71 of the channel unit 70. The heat generated by the electrochemical reaction of hydrogen and oxygen in an exemplary embodiment of the present invention, as described above, may be removed by a coolant flowing through the cooling passages 90 between the separators 50 of adjacent fuel cells 100.

As described above, according to the fuel cell 100 of an exemplary embodiment of the present invention, a reaction gas may be more uniformly distributed to the microporous body 60 of the reaction surface 53 through the channel unit 70 of the separator 50. Further, in an exemplary embodiment of the present invention, the reaction surface 53 of the separator 50 may be divided into several reaction areas 55 by the separation walls 80, the microporous body 60 may be divided into several parts 61 in the reaction areas 55, and the channels 71 of the channel unit 70 may be divided into several channel groups 75 connected with the reaction areas 55, respectively.

Accordingly, in an exemplary embodiment of the present invention, it may be possible to continuously uniformly distribute reaction gases to the microporous body 60, maintain a more stable performance of the fuel cell even under sudden interference from the exterior such as over-inflow of condensate water, and prevent flow stagnation of the reaction gases due to partial concentration of product water produced by a reaction. Further, in an exemplary embodiment of the present invention, since the grooves 81 forming the separation walls 80 may be used as the cooling passages 90 through which a coolant flows, the efficiency of cooling a fuel cell may be increased.

Figure 4:
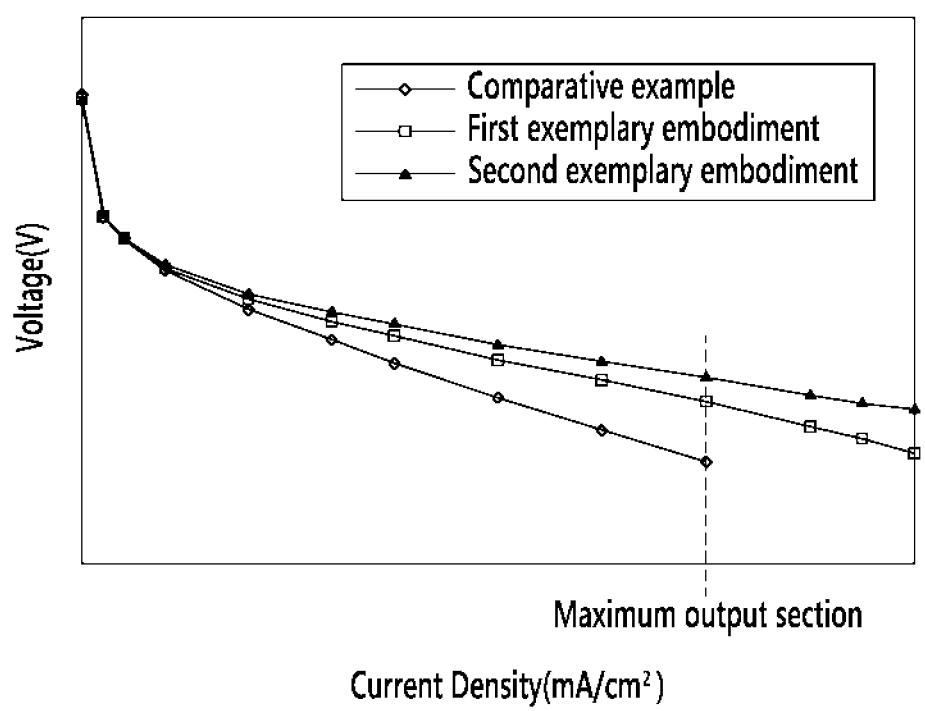
FIGS. 4 and 5 are exemplary graphs illustrating the operation effects of a fuel cell according to an exemplary embodiment of the present invention.
Figure 5:
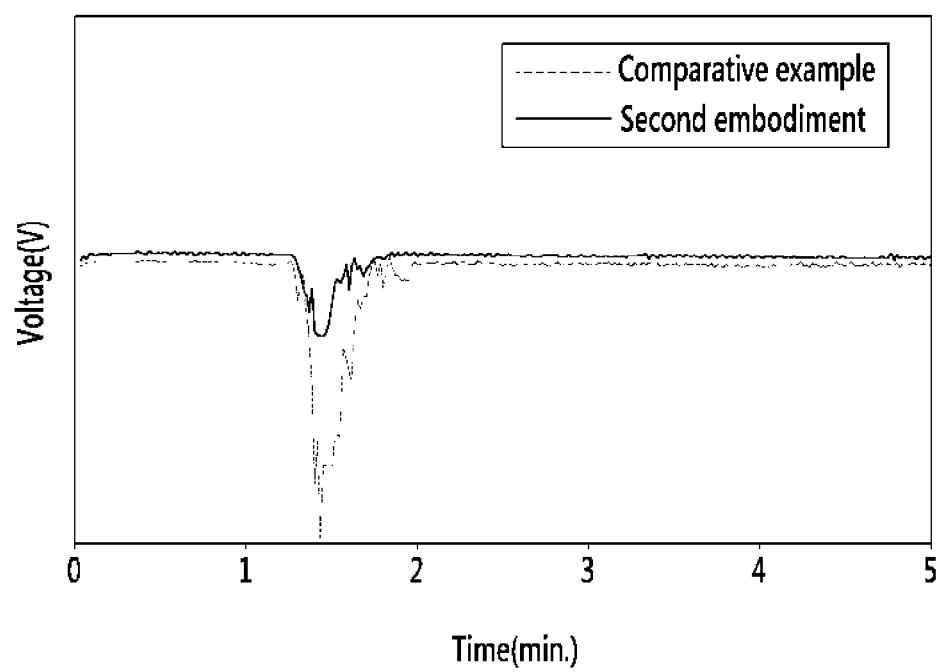

Operational effects of the fuel cell 100 according to an exemplary embodiment of the present invention are described hereafter with reference to FIGS. 4 and 5. FIG. 4 is an exemplary graph showing the results of testing a fuel cell according to a comparative example of the related art in which only a microporous body was provided, a fuel cell according to a first exemplary embodiment of the present invention in which a microporous body and a channel unit were provided, and a fuel cell according to a second exemplary embodiment of the present invention in which a microporous body, a channel unit, and separation walls were provided.

As shown in FIG. 4, the performance of the fuel cell increased by 15% at the maximum output section in the first exemplary embodiment of the present invention in comparison to the comparative example and the performance of the fuel cell increased by 20% at the maximum output section in the second exemplary embodiment of the present invention in comparison to the comparative example.

FIG. 5 is an exemplary graph showing test results of cell operation stability on the comparative example and the second exemplary embodiment of the present invention. As shown in FIG. 5, comparing the behaviors of cell voltage in the comparative example and the second exemplary embodiment in which condensate water flowed inside from the outside of the cell under constant load in the fuel cell, more stable cell behavior is shown in the second exemplary embodiment of the present invention than in the comparative example, since the condensate water from the outside flows more uniformly in the cell and a sudden cell voltage drop is reduced.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10 . . . Membrane-electrode assembly
30 . . . Gas diffusion layer
50 . . . Separator
51 . . . Inlet manifold
52 . . . Outlet manifold
53 . . . Reaction surface
55 . . . Reaction area
60 . . . Microporous body
61 . . . Part
70 . . . Channel unit
71 . . . Channel
73 . . . Rib
75 . . . Channel group
80 . . . Separation wall
81 . . . Groove
90 . . . Cooling passage

What is claimed is:

1. A fuel cell that includes a membrane-electrode assembly and separators disposed at both sides of the membrane-electrode assembly, the fuel cell comprising:
a conductive microporous body formed on a reaction surface of the separator corresponding to the membrane-electrode assembly and is configured to supply a reaction gas to the membrane-electrode assembly,
wherein the separator has inlet and outlet manifolds for the reaction gas to flow into and out of and a channel unit connected with the inlet manifold and the outlet manifold and configured to guide a reaction gas to the reaction surface,
wherein the channel unit guides the reaction gas flowing into the inlet manifold to the conductive microporous body of the reaction surface and allows the reaction gas passing through the conductive microporous body to flow to the outlet manifold, and wherein separation walls that divide the conductive microporous body into several sections are formed on the reaction surface of the separator, the separation walls are formed in the shapes of grooves on the side opposite to the reaction surface and protrude toward the reaction surface, and the grooves are formed as cooling passages through which a coolant flows.

2. The fuel cell of claim 1, wherein the channel unit forms channels that expand from the inlet manifold and the outlet manifold to the reaction surface.

3. The fuel cell of claim 2, wherein the channels increase in length from one of the inlet manifold and the outlet manifold to the other one, and are connected to the reaction surface.

4. The fuel cell of claim 2, wherein the channel unit forms ribs between the channels.

5. The fuel cell of claim 4, wherein separation walls that divide the conductive microporous body into several parts are formed on the reaction surface of the separator, and the separation walls are connected with the ribs and divide the reaction surface into several reaction areas.

6. The fuel cell of claim 5, wherein the separation walls divide the channels into several channel groups connected with the reaction areas, respectively.

7. A vehicle comprising the fuel cell system of claim 1 that includes the membrane-electrode assembly and the separators disposed at both sides of the membrane-electrode assembly.

* * * * *